United States Patent
Krajcir

[11] Patent Number: 6,007,748
[45] Date of Patent: Dec. 28, 1999

[54] PRODUCTION OF MOLDED LAMINATED ARTICLES, PARTICULARLY SOLES FOR FOOTWEAR

[76] Inventor: Dezi Anthony Krajcir, 130 Ramsay Drive, P.O. Box 66, Dunnville, Ontario, Canada, N1A 2X1

[21] Appl. No.: 08/951,447

[22] Filed: Oct. 16, 1997

[51] Int. Cl.⁶ .............................. B29C 44/06; B29C 45/16
[52] U.S. Cl. ...................... 264/46.4; 264/46.8; 264/244; 264/266; 264/511
[58] Field of Search .................................. 264/511, 46.8, 264/244, 46.5, 46.4, 266; 425/129.2

[56] References Cited

U.S. PATENT DOCUMENTS

| | | | |
|---|---|---|---|
| 3,447,251 | 6/1969 | Drexler | 264/244 |
| 3,852,005 | 12/1974 | Sculati et al. | 264/244 |
| 3,940,468 | 2/1976 | Tunstall | 264/46.6 |
| 3,985,853 | 10/1976 | Weisberg | 264/266 |
| 4,245,406 | 1/1981 | Landay et al. | 36/14 |
| 4,479,296 | 10/1984 | Sabins | 264/266 |
| 4,801,256 | 1/1989 | Landwehr et al. | 264/244 |
| 4,810,178 | 3/1989 | Proll et al. | 264/244 |
| 4,886,238 | 12/1989 | Davis | 264/244 |
| 5,032,330 | 7/1991 | Auberry et al. | 264/46.5 |
| 5,230,844 | 7/1993 | Macaire et al. | 264/46.5 |
| 5,362,435 | 11/1994 | Volpe | 264/266 |
| 5,667,738 | 9/1997 | Krajcir | 264/244 |
| 5,707,701 | 1/1998 | Saitoh et al. | 428/36.91 |

FOREIGN PATENT DOCUMENTS

| | | | |
|---|---|---|---|
| 5-207903 | 8/1993 | Japan | 264/244 |
| 5-253004 | 10/1993 | Japan | 264/244 |
| 2 139 940 | 11/1984 | United Kingdom | 264/244 |

*Primary Examiner*—Allan R. Kuhns
*Attorney, Agent, or Firm*—McConnell and Fox

[57] ABSTRACT

In methods and apparatus for the production of molded laminated articles a thin layer of a first moldable heat curable material is placed in the mold cavity of a heated mold and thereafter a second polymerisable material is injected to fill the remainder of the cavity, so that the materials are in intimate contact and form the laminate. The polymerisation of the second material is exothermic and the curing of the first material is facilitated by heat from this reaction. Preferably the second material is also foamable and the foaming generates pressure that molds the first material against the mold surface while it is being cured. Preferably the layer of first material is brought in contact with the mold surface, and air that would otherwise be trapped between them, is removed by drawing a vacuum between the layer and the surface. A preferred first material is epoxidised bondable uncured vulcanisable rubber and a preferred second material is foamable polymerisable polyurethane. The resultant article may be a laminated footwear sole in which the cured layer of first material constitutes an outer tread layer of the sole with the polymerised polyurethane constituting the remainder of the sole. Such a sole may be attached to the remainder of the boot or shoe by the molding operation. Apparatus for molding the laminated articles comprise a mold with one or a plurality of passage means passing through the mold and having respective outlets at the surface against which the article is to be molded, and means for drawing a vacuum at the outlets.

13 Claims, 3 Drawing Sheets

PRODUCTION OF MOLDED LAMINATED ARTICLES, PARTICULARLY SOLES FOR FOOTWEAR

FIELD OF THE INVENTION

This invention relates to methods and apparatus for the production of molded laminated articles, particularly molded laminated soles for footwear and also to footwear comprising molded laminated soles made by such methods and/or with such apparatus. It relates particularly to such methods and apparatus, and to such footwear, in which the sole comprises an outer tread layer of a material different from the immediately adjacent material.

BACKGROUND OF THE INVENTION

Footwear, particularly boots and shoes intended for industrial application, commonly are made by molding a sole of plastics material directly around the lower edge of the upper, the molding operation also joining the two parts together. In this specification and the appended claims the term "sole" as applied to footwear embraces the entire lower portion of such footwear namely the forward sole portion and the rearward heel portion. Foamed polyurethane plastics materials commonly are used for this purpose and generally are found to be very satisfactory, although there are some applications in which it would be preferable to use alternative materials, such as rubber. For example, in iron and steel industry plants there is increased possibility that the footwear will be subjected to temperatures high enough to soften a polyurethane sole, or even high enough to melt the material, e.g. if the wearer steps on a hot piece of metal. Another example arises when the footwear is used in very cold temperatures, the polyurethane becoming hard, brittle and somewhat slippery underfoot. Rubber materials can have higher abrasion resistance than polyurethanes and are more satisfactory under these conditions, but generally are also much more expensive, to the extent that footwear with a sole entirely of rubber would be more expensive than is generally acceptable for this type of product. One solution to the problem has been to make the footwear with a sole in which the major part is of polyurethane, while a thin outer layer forming the sole tread is of rubber.

Apparatus for the production of footwear with molded soles almost universally comprises a turntable with a plurality of molds spaced uniformly around the turntable circumference at a corresponding number of stations. At a loading station a boot upper is mounted on a last which is engaged with the remainder of the respective mold to close its sole forming cavity; the plastics material is then injected to fill the cavity. The turntable is indexed while the plastics material polymerizes and hardens and while successive stations are loaded until the molding operation is complete and the finished boot or shoe can be removed at an unloading station; the cycle then repeats. In one known process for the production of footwear comprising such a laminated sole a thin flat layer of a first material, usually a vulcanisable rubber compound, is loaded into the mold and engaged by a dummy last of the shape required to cooperate with the mold in forming the tread layer alone; the turntable is then rotated through a first cycle during which the layer is vulcanised under heat and pressure and molded to the required shape. At the end of the first cycle the dummy last is replaced by a last carrying a boot or shoe upper and the turntable indexed through a second cycle during which the remainder of the sole is formed and the boot or shoe completed. Such a two cycle process lowers the output available from each machine, as compared to one producing footwear in which the sole is entirely of a single material, and correspondingly increases the cost of production. In another prior art process the sole tread parts are first molded to shape from a cured rubber compound, using molds with the required thin mold cavities and with the tread patterns required in the finished footwear, so that the molded tread parts can be fitted by the operator into the footwear producing molds prior to closing them and injection of the plastics material therein. Such a process requires the use either of a separate machine, or of a footwear producing machine, during the period taken by the curing and molding, and in addition requires the provision of a separate set of tread-forming molds for each pair of boots or shoes, for each size to be produced, and for each tread pattern required.

SUMMARY OF THE INVENTION

It is a principal object of the invention to provide new methods and apparatus for the production of molded laminated articles comprising a first layer of a heat treatable material and a second layer of a polymerisable material with which the polymerisation reaction is exothermic and provides heat for the heat treatment of the first material.

It is another principal object of the invention to provide new methods and apparatus for the production of such molded laminated articles with which the material of the second layer is foamable and generates internal pressure during the polymerisation reaction, which pressure is employed during the molding operation to press the first layer against a mold surface and accurately mold the layer to the shape of the surface.

It is a further principal object to provide new methods and apparatus for the production of laminated soles for footwear and footwear comprising molded laminated soles made by such methods and/or with such apparatus, in which the sole comprises an outer tread layer of a material different from the immediately adjacent material.

It is a specific object to provide such methods and apparatus, and such footwear, in which the sole comprises an outer tread layer of a molded vulcanised rubber material and the remainder of the sole comprises molded foamed polyurethane plastics material.

In accordance with the present invention there is provided a method for the production of molded laminated articles in a mold having a mold cavity comprising the steps of:

placing in the mold cavity a layer of a first moldable heat curable material in contact with a surface thereof so as to be molded by the surface;

injecting into the mold cavity second polymerisable material to fill the remainder of the cavity, the polymerisation reaction of the second material being exothermic; and molding the first and second materials to form a laminated article with adjoining attached layers of cured first material and polymerised second material;

wherein curing of the first material employs heat produced by the exothermic reaction of the second material.

Also in accordance with the invention there is provided a method for the production of molded laminated articles in a mold having a mold cavity comprising the steps of:

placing in the mold cavity a layer of a first moldable material in contact with a surface thereof so as to be molded by the surface;

injecting into the mold cavity second foamable material to fill the remainder of the cavity;

wherein the foaming of the second material generates pressure therein as it is confined within the mold cavity; and molding the first and second materials to form a laminated article with adjoining attached layers of molded first material and foamed second material;

wherein molding of the first material against the mold surface employs pressure produced by the foaming of the second material.

When the first material is heat curable material and the second material is foamable polymerisable material curing of the first material employs heat produced by the exothermic reaction of the second material and molding of the first material against the mold surface employs pressure produced by the foaming of the second material.

Preferably the layer of first material is placed within the mold cavity and thereafter is brought in contact with the mold surface by drawing a vacuum between the layer and the said mold surface. The first material may be a vulcanisable rubber and the heat treatment results in vulcanisation thereof, while the second material may be a foamable polymerisable polyurethane.

The resulting article may be a laminated footwear sole in which the layer of cured first material constitutes an outer tread layer of the sole and in which the foamed polymerised polyurethane constitutes the remainder of the sole, and more specifically it may be a boot or shoe having a laminated footwear sole attached to the remainder of the boot or shoe by the molding operation, in which the layer of cured first material constitutes an outer tread layer of the sole, and in which the foamed polymerised polyurethane constitutes the remainder of the sole.

DESCRIPTION OF THE PREFERRED EMBODIMENTS

Figure 1:
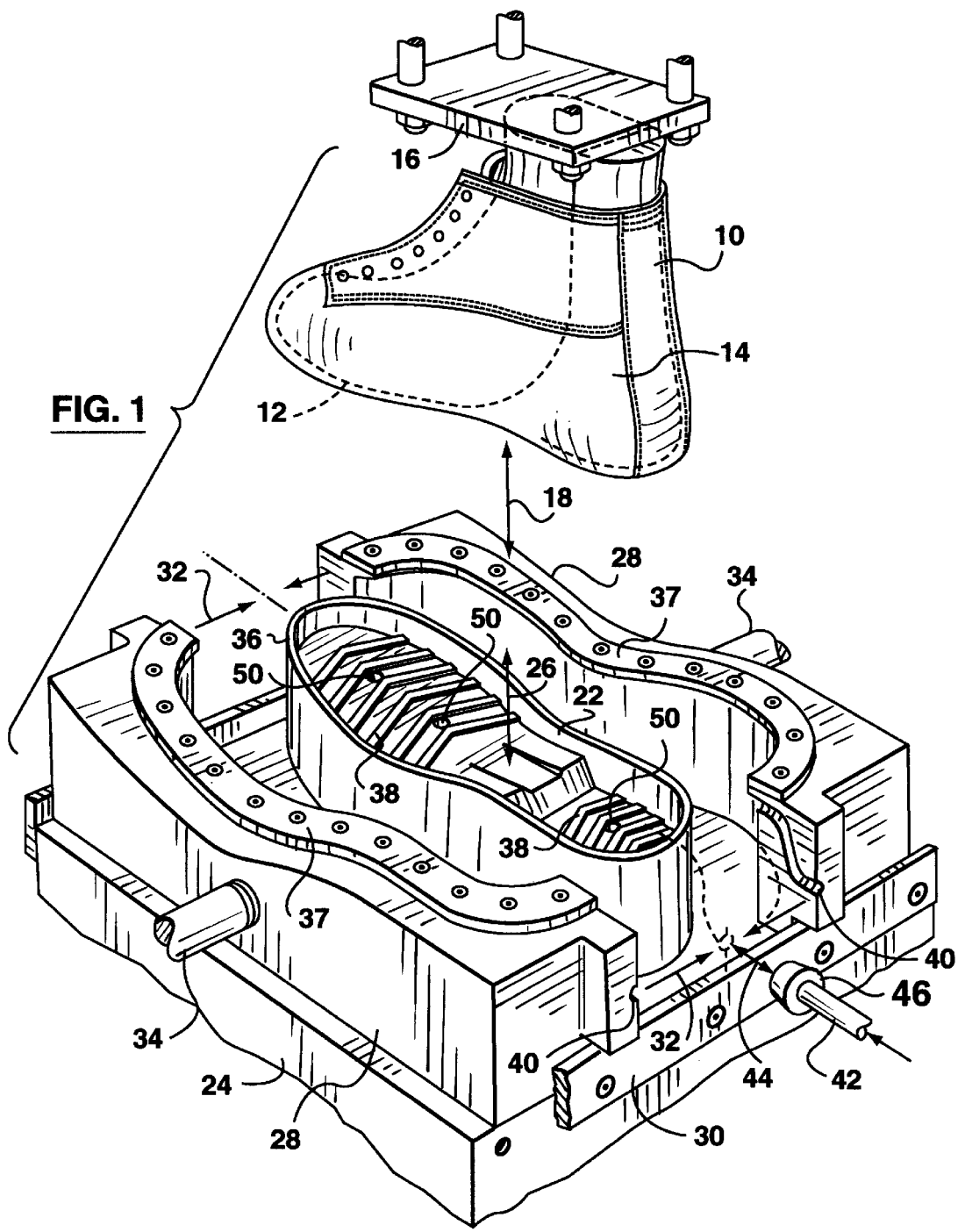
FIG. 1 is an exploded perspective view showing a boot upper in place on a last ready for a composite sole to be attached thereto by molding, and also showing in open disposition a three-part sole mold of the invention for molding the composite sole on the boot upper.

Referring now to FIG. 1, a preformed boot upper 10, made of leather or other suitable equivalent material, is mounted on a two-part metal separable last comprising a toe part 12 and a heel part 14, the separable parts enabling it to be inserted into the boot upper and removed from the finished boot. The last is mounted on a carrier member 16 which is movable in the directions of arrows 18 by motor means which are not shown. The tabbed turned-in lower edge portion of the boot upper (not shown) is folded over the outer edge of an insole 20 (FIG. 4), the two being attached to one another by a suitable adhesive, which is not shown. The bottoms of the boot upper and of the insole are prepared in known manner to receive a molded-in-place laminated sole, to be described in detail below, by abrading and coating with a layer of sealing material (not shown) that prevents the molding material from penetrating too deeply into the insole and leather upper while permitting adequate adhesion thereto. The last cooperates with a metal sole mold comprising a sole part 22 which is mounted on a base member 24 and is movable vertically as required in the directions of arrows 26 by means which are not shown, and two side parts 28 which are mounted on the base member 24 for sideways movement between end guides 30 in the directions of the arrows 32, motor means for such movement being indicated by connection shafts 34. A plurality of lasts and sole molds are mounted on a multi-stage machine (not shown), usually comprising a turntable around which the molds are uniformly circumferentially spaced at respective stations, in which the molding process is carried out as the cooperating lasts and molds are indexed from station to station.

Although in the drawings a boot upper is shown as mounted on the last the apparatus and process is fully operative with a shoe upper so mounted.

In carrying out the usual prior art molding operation the last is lowered until the bottom surface of the boot upper is a predetermined distance from the upper edge 36 of the sole part 22, and the mold side parts 28 are moved together until they butt against the central sole part 22, and welt forming side members 37 press against the sides of the boot upper, thus forming a tightly closed mold cavity of the final shape for the boot sole with an integral heel part. The upper surface of the sole part 22 is the bottom surface of this mold cavity and is provided with upstanding ridges 38 that produce a corresponding tread pattern in the finished boot sole. The side parts 28 are provided at adjacent ends with mating semi-circular cross section bores 40 which, when the two parts are pressed together, form a delivery passage through which foaming plastics molding material is injected into the mold cavity, the material being supplied from a mixing apparatus (not shown) via a feed pipe 42 that is axially movable back and forth in the directions of arrows 44, the feed pipe being provided at the end that contacts the mold with a sealing member 46 that seals the temporary junction between them.

The sole part 22 is provided with three approximately uniformly longitudinally spaced passages or bores 48 each of which opens into the mold cavity at the tread surface via a respective opening 50. As will be seen from FIG. 4, the passages are connected by piping to a vacuum reservoir 52 equipped with a vacuum gauge 54, the vacuum in the reservoir being produced by a vacuum pump 56. A solenoid valve 58 is operable at the required time during a molding cycle to draw a vacuum in the mold at the tread surface. The sole part 22 is heated to a predetermined temperature, usually about 150° C., by a thermostatically controlled heating element 60 mounted therein, and in this embodiment only the sole part 22 is provided with such an element since its area of contact with the molded sole for heat transfer thereto is very much greater than that of the two side parts 28, and the area is adequate for that purpose. However, if additional heating is required this can be provided by installing heaters in the side parts.

Figure 2:
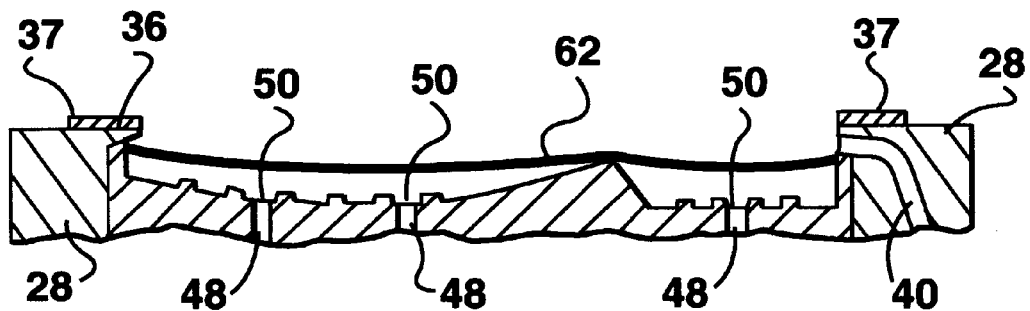
FIG. 2 is a part cross section on the centre line of the sole mold of FIG. 1 showing preliminary insertion in the mold of a thin layer of material that after molding will become the outer tread layer of the molded sole.
Figure 3:
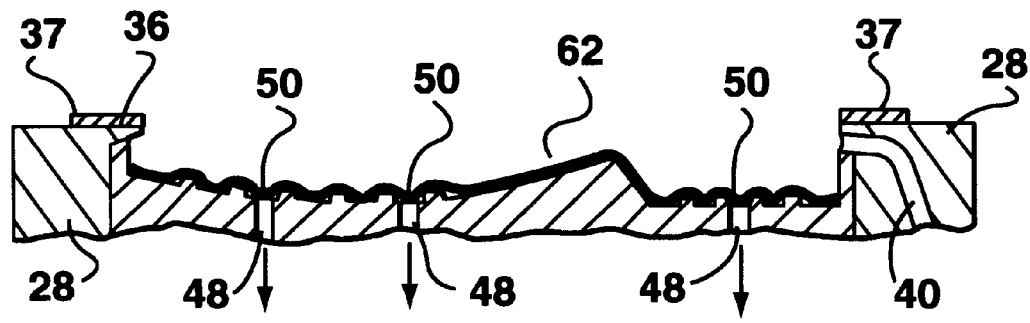
FIG. 3 is a part cross section, the same as FIG. 2, showing the thin layer of material urged by vacuum between it and the mold surface into close contact with the upper surface of the sole mold prior to the molding operation.
Figure 4:
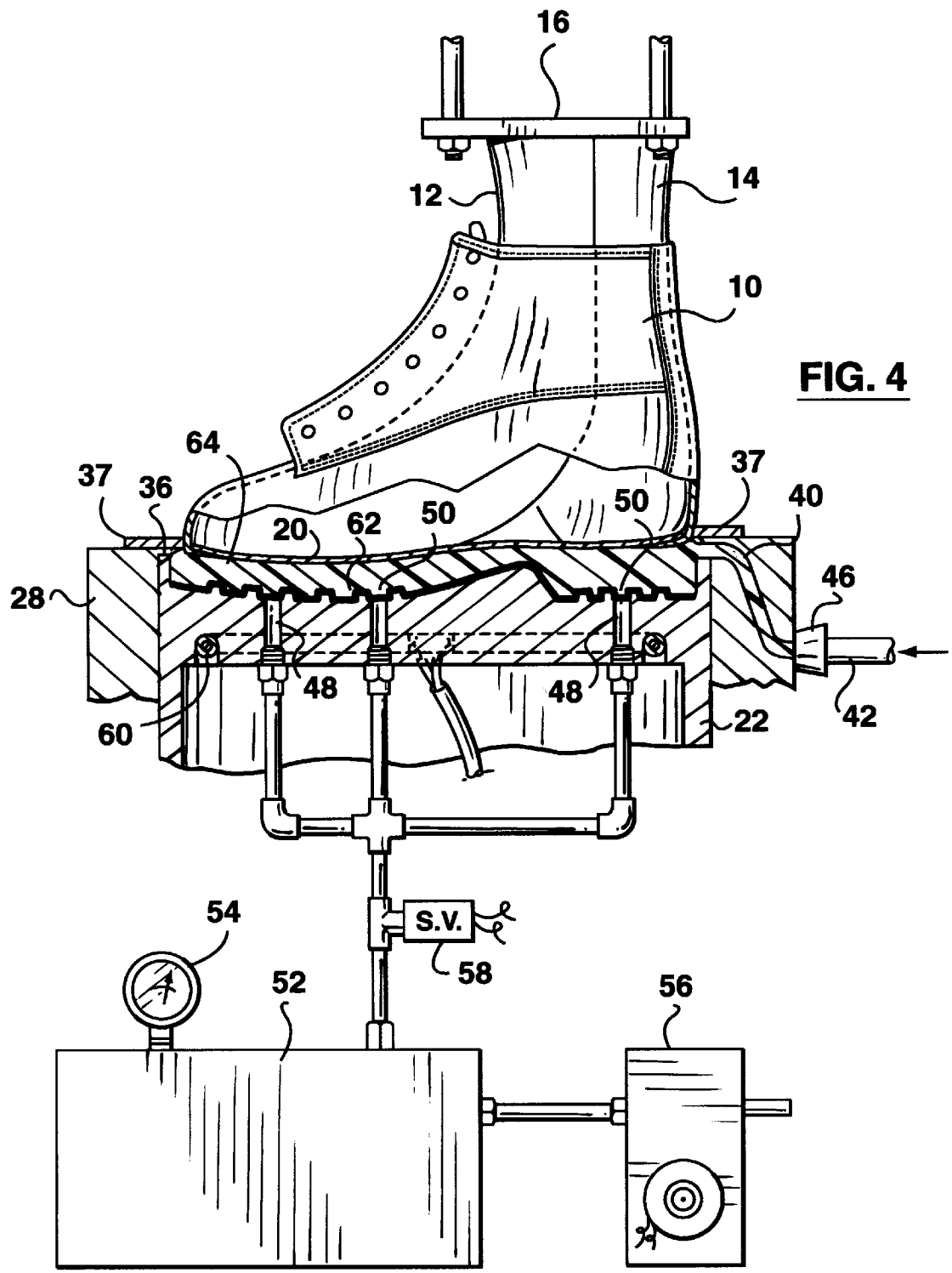
FIG. 4 is a part side elevation and a part longitudinal cross section of the boot upper, a cross section on the centre line of the sole mold showing a molded composite sole in production, and showing diagrammatically vacuum apparatus employed during the molding operation.

In the manufacture of a boot or shoe using a process and apparatus of the invention the operator at the loading station places in the mold cavity a thin flat piece 62 comprising a layer of a first curable material, in this embodiment a vulcanisable rubber material, of shape in plan corresponding to that of the sole tread surface and therefore fitting snugly into the mold, as shown in FIG. 2. The control valve 58 is then opened and the vacuum applied from the reservoir 52 to the space between the piece 62 and the mold tread surface, thus removing the air therefrom to the extent provided by the vacuum, and under the pressure on the piece produced by the vacuum drawing the piece down into intimate contact with the tread surface, as shown in FIG. 3. The last with a boot or shoe upper 10 in place is now moved downward until the mold is closed, as described above. A measured quantity of the foamable plastics molding material, in this embodiment a foamable polymerisable polyurethane, which in its initial freshly mixed state is freely flowable, is injected into the mold cavity from the delivery passage 40, when it immediately expands so as to fill the mold cavity and form the remainder 64 of the molded laminated sole. When sufficient material has been injected the sole part 22 is moved upward in the direction of the arrow 26 to close the passage 40 and cut off the flow of polyurethane; this movement is not illustrated but will be apparent to those skilled in the art. The turntable is then indexed to bring the next station to the operator and the loading step repeated. The foaming and polymerisation reaction of the polyurethane material is strongly exothermic to the extent that it generates an internal temperature of the order of 170°–175° C., and at the same time generates a considerable internal pressure. It is difficult to measure the exact range of values of this internal pressure, but it may be noted that the hydraulic motor that lifts the sole part 22 to close the passage 40 exerts a pressure in the range 7.0–8.4 Kg/sq cm (100–120 p.s.i.) in order to keep the boot upper correctly placed in the mold while the polyurethane is curing. The layer 62 is forced by this pressure into intimate contact with the sole part tread surface, and this pressing is reinforced by the vacuum and is made possible by the prior removal of air from between the layer and the mold tread surface by the vacuum. At the same time the layer is subjected on both sides to a temperature sufficient to cure and vulcanise it to its final state during the period that the turntable is indexed to bring the mold to the unloading station. At the same time, by the time the mold reaches the unloading station the foamed molding polyurethane material has solidified and cured to the extent that the boot can safely be removed from the mold. The finished boot will appear as is illustrated by FIG. 4, with the upper 10 and the molded tread portion 62 securely attached by the single molding operation to the intervening foamed polyurethane portion 64 of the sole.

Although in this embodiment three longitudinally spaced bores 48 are formed in the sole mold part to provide relatively uniform distribution of the vacuum a single bore can be provided, although it may then be found necessary to increase the value of the vacuum in order to ensure exhaustion of all of the air and intimate contact of the piece 62 over the entire mold tread surface, particularly since the piece closes off the openings 50 as it engages them. Two, or more than three bores can also be provided, the number selected being that found necessary to ensure that sufficient air exhaustion occurs before the last descends to close the mold and injection of the polyurethane begins.

By way of example, in a specific embodiment in which the molding material is a proprietary foamable polyester polyurethane sold by I.C.I. (Imperial Chemical Industries) the unfoamed freshly mixed material takes about 1–2 seconds for injection into the mold interior. The material usually attains a maximum reaction temperature of 173° C. and requires about 4–5 minutes for it to be sufficiently hardened for the boot to be removed, the indexing speed of the machine being set accordingly. Also in this embodiment the layer 62 of vulcanisable rubber is a proprietary uncured rubber sold by Brighton Custom Rubbers of Brighton, Ontario and requires approximately 2–4 minutes to cure at a temperature of 150° C., so that there is adequate time and temperature for vulcanisation to take place while the polyurethane is hardening. It is of course necessary for the materials to interact with one another to form a secure bond between them, and the rubber specified is designated by its supplier as being an expoxidised bondable uncured rubber, the expoxidisation providing desired additional bonding power.

Foamable materials other than polyurethanes can be used for the molded sole body part 64, such as for example, synthetic rubbers or PVC materials, provided that the polymerisation reaction is sufficiently exothermic to generate a suitable reaction temperature for the material of the first layer 62, and also generates sufficient pressure to ensure that the tread surface of the first layer will be molded sufficiently accurately against the mold tread surface. Similarly, materials other than rubber can be used for the first layer 62 provided that the temperature and pressure generated by the reaction of the material of the second layer 64 are sufficient to produce the necessary amount of curing during the time available for a normal cycle of the machine. The materials must also exhibit sufficient mutual bonding when heated and compressed in this manner, and the bonding may be facilitated by use of specially prepared materials as described above, or by providing a thin layer of suitable adhesive on the top surface of the layer 62.

Work boots and shoes differ in important respects from casual, sports and high-style footwear in that inherently they are required to be durable and protective, and hence must be made of durable materials. Also, they either are bought by employees who tend to regard them as utilitarian products for which they may therefore be reluctant to spend more than is necessary, or they are supplied to the employee by an employer who buys in quantity, with the result that they tend to be more price sensitive than non-work footwear. Although the invention has been particularly described herein as directed principally to methods and apparatus for the production of work footwear, and to such footwear when produced by the methods and apparatus, it will be apparent to those skilled in the art that nevertheless the invention is applicable to all types of footwear incorporating a molded laminated heel in providing an economical way of manufacturing such footwear.

Again, although the invention has been particularly described as applied to the manufacture of footwear by producing the laminated sole simultaneously with its attachment to the footwear upper it is also applicable to the manufacture of soles alone that subsequently are attached to the upper by any of the systems, other than molding, well known to those skilled in the footwear manufacturing industry. Moreover, it is also applicable to the manufacture of other molded laminated articles in which advantage can be taken of the exothermic and/or pressure producing properties of a polymerisation reaction to simultaneously mold, cure and attach a layer of heat and pressure curable material to the polymerising material during its reaction.

I claim:

1. A method for the production of molded laminated articles in a mold having a mold cavity comprising the steps of:

placing in the mold cavity a layer of a vulcanisable rubber constituting a moldable heat vulcanisable first material, the layer being in contact with a surface thereof so as to be molded by the surface;

injecting into the mold cavity a polymerisable second material to fill the remainder of the cavity, the polymerisation reaction of the second material being exothermic; and molding the first and second materials to form a laminated article with adjoining attached layers of vulcanised first material and polymerised second material;

wherein vulcanisation of the first material employs heat produced by the exothermic reaction of the second material.

2. A method as claimed in claim 1, wherein the polymerisable second material is foamable and the foaming thereof generates pressure therein as it is confined within the mold cavity; and wherein molding of the first material against the mold surface employs pressure produced by the foaming of the second material.

3. A method as claimed in claim 2, wherein the polymerisable second material is a foamable polyurethane.

4. A method as claimed in claim 3, wherein the article is a laminated footwear sole in which the layer of vulcanised vulcanisable first material constitutes an outer tread layer of the sole and the polymerised polymerisable polyurethane second material constitutes the remainder of the sole.

5. A method as claimed in claim 3, wherein the article is a boot or shoe having a laminated footwear sole attached to the remainder of the boot or shoe by the molding operation, in which the layer of vulcanised vulcanisable first material constitutes an outer tread layer of the sole, and in which the polymerised polymerisable polyurethane second material constitutes the remainder of the sole.

6. A method as claimed in claim 1, wherein the layer of first material is placed within the mold cavity and thereafter is brought in contact with the mold surface by drawing a vacuum between the layer and the said mold surface.

7. A method for the production of molded laminated articles in a mold having a mold cavity comprising the steps of:

placing in the mold cavity a layer of a vulcanisable rubber constituting a moldable first material in contact with a surface thereof so as to be molded by the surface;

injecting into the mold cavity foamable second material to fill the remainder of the cavity;

wherein the foaming of the second material generates pressure therein as it is confined within the mold cavity; and molding the first and second materials to form a laminated article with adjoining attached layers of vulcanised molded first material and foamed molded second material;

wherein molding of the first material against the mold surface employs pressure produced by the foaming of the second material.

8. A method as claimed in claim 7, wherein the layer of first material is placed within the mold cavity and thereafter is brought in contact with the mold surface by drawing a vacuum between the layer and the said mold surface.

9. A method as claimed in claim 7, wherein the foamable second material is a polymerisable polyurethane that is polymerised during the molding operation.

10. A method as claimed in claim 9, wherein the article is a laminated footwear sole in which the layer of vulcanised vulcanisable molded first material constitutes an outer tread layer of the sole and in which the foamed polymerised polymerisable molded polyurethane constitutes the remainder of the sole.

11. A method as claimed in claim 9, wherein the article is a boot or shoe having a laminated footwear sole attached to the remainder of the boot or shoe by the molding operation, in which the layer of vulcanised vulcanisable molded first material constitutes an outer tread layer of the sole, and in which the foamed polymerised polymerisable molded polyurethane constitutes the remainder of the sole.

12. A method for the production of a boot or shoe comprising a molded laminated sole attached by molding to an upper comprising the steps of:

placing in a mold cavity of a mold a layer of a heat vulcanisable rubber material;

drawing a vacuum between the layer and a tread surface of the mold that is to mold an outer tread surface of the boot or shoe so as to bring the layer into contact with the mold tread surface;

closing the mold cavity with a boot or shoe upper to which the sole is to be molded;

injecting into the mold cavity foamable polymerisable polyurethane material to fill the remainder of the cavity;

the polymerisation reaction of the polyurethane material being exothermic and the foaming thereof generating pressure therein as it is confined within the mold cavity; and molding the heat vulcanisable rubber material and the foamable polymerisable polyurethane material together to form a laminated sole with an outer tread layer of heat vulcanised rubber material molded against the mold tread surface and the remainder of foamed polymerised polyurethane material attached by the molding to the boot or shoe upper and to the outer tread layer;

wherein vulcanisation of the heat vulcanisable rubber material employs heat produced by the exothermic reaction of the foamed polymerised polyurethane material and molding of the heat vulcanisable rubber material against the mold surface employs pressure produced by the foaming of the foamed polymerised polyurethane material.

13. A method for the production of a molded laminated sole for attachment to a boot or shoe comprising the steps of:

placing in a mold cavity of a mold a layer of a heat vulcanisable rubber material;

drawing a vacuum between the layer and a tread surface of the mold that is to mold an outer tread surface of the sole so as to bring the layer into contact with the mold tread surface;

closing the mold cavity and injecting therein foamable polymerisable polyurethane material to fill the remainder of the cavity;

the polymerisation reaction of the polyurethane material being exothermic and the foaming thereof generating pressure therein as it is confined within the mold cavity; and molding the heat vulcanisable rubber material and the foamable polymerisable polyurethane material together to form a laminated sole with an outer tread layer of heat vulcanised rubber material molded against the mold tread surface and the remainder of foamed polymerised polyurethane material attached by the molding to the outer tread layer;

wherein vulcanisation of the heat vulcanisable rubber material employs heat produced by the exothermic reaction of the foamed polymerised polyurethane material and molding of the heat vulcanisable rubber material against the mold surface employs pressure produced by the foaming of the foamed polymerised polyurethane material.

* * * * *